United States Patent Office 3,250,748
Patented May 10, 1966

3,250,748
PRODUCTION OF WATER-SOLUBLE POLYVINYL ALCOHOL-UREA DERIVATIVES
Hideo Suzumura, Katsuaki Hirano, and Teiichiro Chiba, Kurashiki, Japan, assignors to Kurashiki Rayon Co., Ltd., Okayama, Japan, a corporation of Japan
No Drawing. Filed Dec. 1, 1961, Ser. No. 156,474
Claims priority, application Japan, Dec. 8, 1960, 35/47,877
The portion of the term of the patent subsequent to Oct. 6, 1981, has been disclaimed
6 Claims. (Cl. 260—77.5)

The invention relates to the preparation of derivatives of polyvinyl alcohol and is more particularly concerned with the production of nitrogen-containing polyvinyl alcohol derivatives which are readily soluble in cold water.

Polyvinyl alcohol has recently come to be used extensively as a base for various types of adhesives and finishing agents for woven fabrics because of the binding power of its aqueous solutions, and because of the tenacity, gloss, agreeable feel, and like desirable characteristics of films obtained from aqueous solutions of polyvinyl alcohol. However, known polyvinyl alcohols generally require the use of heat to put them into solution in water or they are, at best, dissolved in cold water only with difficulty.

As is well known, an aqueous solution of fully saponified polyvinyl alcohol can not be obtained unless dissolution is effected by heating. Accordingly, in seeking a polyvinyl alcohol of cold-water-solubility, partially-saponified polyvinyl alcohol has been used. However, even this presents problems. For example, it is necessary to impart to the mixture of water and polyvinyl alcohol a relatively violent agitation. When such agitation is not provided, even the partially-saponified polyvinyl alcohol will rapidly swell as it comes into contact with the water, with the resultant formation of gels which enclose and trap undissolved polyvinyl alcohol particles, giving rise to undissolved powder lumps. When such undissolved powder lumps form, further dissolution is greatly retarded. There has existed, therefore, an unfilled need for a polyvinyl alcohol which is freely soluble in cold water without need for violent agitation and like special techniques.

It is thus an object of this invention to provide a polyvinyl alcohol which will rapidly and freely dissolve in cold water.

It is another object of the invention to provide a process of producing a polyvinyl alcohol of good cold-water-solubility.

It is known that urea and alcohols will interact upon heating at high temperatures. It is also known that polyvinyl alcohol which is, chemically, a type of polyvalent alcohol, will react with urea upon heating in the presence of ethylene glycol or water (Paquin, Z. Naturforschung 1, 518, 1946). We have investigated the relationship between the character of the products of reaction between polyvinyl alcohol and urea and the conditions of reaction. We have found that by proper control of the conditions of reaction, highly water-soluble polyvinyl alcohol derivatives can be obtained. We have also ascertained that when a large quantity of water or ethylene glycol is present at the time of reaction, the reaction between polyvinyl alcohol and urea will be retarded. For instance, in order to obtain a cold water-soluble reaction product by causing polyvinyl alcohol to react with urea in the presence of more than 10% of water by heating at 140° C., a large amount of urea is necessary, viz. an amount of urea which is more than 60% based on the weight of polyvinyl alcohol, will have to be added. According to the literature referred to above, it is presumed that the presence of water in an amount of more than 12% is required, even in the last stage of the reaction. Accordingly, if a water-soluble polyvinyl alcohol derivative is to be produced under such conditions, a large amount of urea is needed. The reaction between polyvinyl alcohol and urea may also be effected by applying heat after the polyvinyl alcohol has been dissolved in a large quantity of molten urea.

However, even when the reaction is carried out with the urea, in such molten condition, the quantity of urea needed is still more than 60% of the weight of polyvinyl alcohol. When the amount of urea is less than 50%, the melting of the urea will be insufficient, and a polyvinyl alcohol soluble in cold water will not be obtained. Thus, when a readily water-soluble polyvinyl alcohol derivative is desired, and the amount of urea used in more than 60%, based on the polyvinyl alcohol, the quantity of unreacted free urea remaining in the product after the reaction will be large, and a very complicated procedure is required to remove the unreacted urea when the reaction product is to be used for various purposes in which the large quantity of unreacted urea is objectionable. As described in our co-pending application of even date, by reducing the water content of a polyvinyl alcohol-urea mixture, which can be characterized as polyvinyl alcohol impregnated with urea, to less than 8%, and by applying heat in an inert environment, i.e. in a reaction zone in which the air has been replaced by an inert gas, a polyvinyl alcohol, more properly characterized as a polyvinyl alcohol derivative, which is readily soluble in cold water, can be produced by use of a very small amount of urea and in a short period of time.

We have now discovered that by charging a mixture of this urea-impregnated polyvinyl alcohol in powder form, even when its moisture content is more than 8%, to an extrusion machine and effecting the heating operation while the powder passes through the heated extrusion zone defined within the extrusion machine, the reaction will be more efficient and efficacious and continuous operation can be carried out more easily, and the desired readily cold-water soluble product will be rapidly produced.

Our studies in connection with methods of producing nitrogenous polyvinyl alcohol derivatives by heating urea-impregnated polyvinyl alcohol have shown that the reaction will be enhanced by use of an extrusion machine as the reaction apparatus, and that this operation is most advantageous for effecting continuous operation on an industrial scale, since a fully uniform reaction product can be obtained in a very short reaction time.

The extrusion machine, sometimes referred to as an extruding machine, which provides the heated extrusion zone for the carrying out of the heating operation in accordance with this invention can be any of the various conventional types of extrusion machines commonly used for the extrusion of thermoplastic resins. Typical machines are described, for example, in U.S. Patents Nos. Re 23,839, 2,893,055 and 2,896,253.

The addition of urea to polyvinyl alcohol, suitably in particulate form, e.g. as a powder, can advantageously be effected by mixing the polyvinyl alcohol powder with urea in solution in water or in an organic solvent, or urea in finely-powdered form can be directly mixed with the polyvinyl alcohol powder. After mixing the urea and polyvinyl alcohol to produce a uniform mixture, the mixture is dried to remove the water or the organic solvent.

Various amounts of urea can be mixed with the polyvinyl alcohol to provide the mixture to be subjected to reaction in the extrusion zone. Even when the amount of urea added is less than 10% based on the weight of the polyvinyl alcohol, a nitrogen-containing polyvinyl alcohol derivative of the desired cold-water solubility can easily be produced in a few minutes. Increasing the amount of urea to more than 10% by weight of the amount of polyvinyl alcohol will facilitate reaction in the extrusion zone, and even when the amount of urea is greater than the amount of polyvinyl alcohol, no difficulty will arise in the course of the reaction. In charging the extruding machine with the urea-impregnated polyvinyl alcohol powder, it is desirable that its water content be below 10%. When the water content is more than 10%, there may be some drop in reactivity. However, the desired nitrogen-containing polyvinyl alcohol derivative can be produced when reaction is carried out in a heated extrusion zone, in accordance with this invention, without difficulty even when the water content is more than 10%.

We have previously found that to produce a cold-water soluble polyvinyl alcohol by using a small amount of urea, it is necessary to replace the air in the reaction atmosphere with an inert gas. However, when the reaction is carried out in an extrusion zone defined by an extrusion machine, it is not necessary to expel the air even when only a very small amount of urea is used. We have discovered that by maintaining the interior of the extrusion zone higher than 140° C. when the urea-impregnated polyvinyl alcohol passes through the extrusion zone, a nitrogenous polyvinyl alcohol derivative can be obtained, and that in order to increase the amount of bound nitrogen in the reaction product, it is necessary only to raise the maximum temperature to 190° C.–230° C. The reaction time in the extrusion zone, i.e. from the moment the material is charged into the extrusion zone to the moment of extrusion, will vary from a few minutes to a few scores of minutes, e.g. 2 minutes to 100 minutes.

The reaction product has a content of combined nitrogen higher than 0.4%, and is readily soluble in water. Particularly when a very high solubility in cold water is exhibited, the amount of bonded nitrogen is 1%–4%. The minimum amount of urea needed for producing a readily-soluble reaction product is 2% based on the weight of polyvinyl alcohol.

The polyvinyl alcohol suitable for use in accordance with the present invention is known polyvinyl alcohol and includes polymers composed principally of the vinyl alcohol radical. Polyvinyl alcohol is a polymer containing hydroxyl groups and corresponding to the formula:

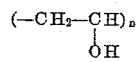

wherein $n$ is an integer which can vary within wide limits, as is well-known in the art. Polyvinyl alcohol can be produced from the corresponding polyvinyl ester, e.g. polyvinyl acetate, by alkaline or acid saponification or re-esterification, i.e. alcoholysis, in accordance with the following equation:

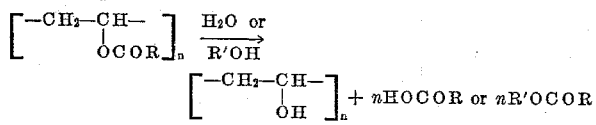

Typical fully-saponified polyvinyl alcohols which can be suitably used are described, for example, in Cline et al. U.S. Patent 2,636,803.

The partially-saponified or partially-esterified polyvinyl alcohol which can be used in accordance with this invention is produced by conventional techniques from polyvinyl esters, such as polyvinyl acetate, by known saponification procedures as described, for example, in Scott et al. U.S. Patent 2,266,996 and Bryant et al. U.S. Patent No. 2,668,809. As is known in the art, a "partially-saponified" polyvinyl alcohol is the product of the hydrolysis of a polyvinyl ester, e.g. polyvinyl acetate, in which less than all of the ester groups, e.g. acetate groups, have been converted to hydroxyl groups. As explained in Scott et al. 2,266,996, the saponification or hydrolysis reaction is stopped by neutralizing the catalyst when the desired percentage conversion has occurred. The partially-saponified polyvinyl alcohols which are suitably used in accordance with this invention are sufficiently saponified that at least about 50% of the ester groups have been converted into hydroxyl groups. The degree of polymerization of the polyvinyl alcohol may vary widely.

The cold-water-soluble polyvinyl alcohol composition produced in accordance with this invention is particularly useful for all purposes for which a water-soluble polyvinyl alcohol is desired, e.g. in adhesives, to form films or other shaped forms which are to be used for purposes where water-solubility is desired, in finishing agents and as quality improving agents for fabrics, but it is by no means limited to such uses. The cold-water-soluble polyvinyl alcohol composition may be combined with fillers and pigments such as clay, kaolin, and the like in conventional manner.

The conditions and the relative relationships set forth in the examples are those preferred in carrying out the process of this invention, but it will be understood that other conditions and relationships may be used within the scope of the invention. In general, unless otherwise indicated, conventional operations and techniques are suitably employed, and all parts are by weight.

*Example 1*

To 1 kg. of fully-saponified polyvinyl alcohol, which was in powder form and had an average degree of polymerization of 1700, was added an aqueous solution prepared by dissolving 1 kg. of urea in 2 kg. of water. After mixing the powder and the solution in a mixer, the resultant mixture was dried at 60° C., and the water content was reduced to 1.2%. This urea-impregnated polyvinyl alcohol powder was then charged to an extruding machine having a screw diameter of 25 mm. and a casing temperature which varied longitudinally from a minimum of 150° C. to a maximum of 200° C., the mixture being charged at a feed rate of 25 g. per min. The reaction product, which was extruded from the end of the extruder after a residence time of 12 min., contained 2.3% bound nitrogen and a degree of urethanation of 7.8%, and was readily soluble in cold water. The reaction product was crushed and washed with methanol, and was found to be well suited as a warp sizing agent for various kinds of fibers. It was particularly easy to desize at low temperature after the weaving operation.

*Example 2*

To 5 kg. of fully-saponified polyvinyl alcohol, in powder form and having an average degree of polymerization of 1700, was added an aqueous soltuion prepared by dissolving 500 g. of urea in 4.5 kg. After mixing the powder with the solution by means of a mixer, the resutant mixture was dried at 60° C., and its water content reduced to 8.0%. This urea-impregnated polyvinyl alcohol powder was then charged to an extruding machine having a screw diameter of 50 mm. and a casing temperature which varied longitudinally from a minimum of 80° C. to a maximum of 200° C., the machine being operated at a feed rate of 100 g. per minute. The reaction product which was extruded from the end of the extruder after a residence time of 5 minutes contained 1.2% bound nitrogen and had a degree of urethanation of 3.9%, with an unreacted free urea content of 2.6%. An aqueous solution of a mixture of polyvinyl alcohol and 30% by weight of this reaction product was spun in conventional manner and the fibers produced were subjected to conventional heat treatment and acetalization. The fibers thus produced had excellent dyeability, particularly for direct dyes.

*Example 3*

To 5 kg. of fully-saponified polyvinyl alcohol, in powder form and having an average degree of polymerization of 1700, was added an aqueous solution produced by dissolving 500 g. of urea in 4.5 kg. of water. After mixing the powder and the solution in a mixer, the resultant mixture was dried at 60° C., to a water content of 2.5%.

This urea-impregnated polyvinyl alcohol powder was charged to an extruding machine having a screw diameter of 50 mm. and a casing temperature which varied longitudinally from a minimum of 100° C. to a maximum of 210° C., the machine being operated at a feed rate of 120 g./min. The reaction product which was extruded from the end of the extruder after a residence time of 4 min. had 1.8% bound nitrogen, a degree of urethanation of 6.0%, and an unreacted free urea content of 1.4%, and it was readily soluble in water. The reaction product was dissolved in water, and a film was formed from the solution in conventional manner at 80° C. The film was colorless and transparent. At a temperature of 20° C. and a relative humidity of 65%, the film exhibited a tensile strength of 4.5 kg./mm.$^2$, an elongation of 140%, and a tear strength of 3.8 kg./mm. Such a film having a thickness of 0.03 mm. dissolved in water in 40 sec. This film did not show any drop in solubility even when heat-treated at 140° C. for 20 minutes.

*Example 4*

To 5 kg. of partially-saponified polyvinyl alcohol, in powder form and having an average degree of polymerization of 550 and a degree of saponification of 88%, was added a solution produced by dissolving 500 g. of urea in 3.5 kg. of methanol. After mixing the powder and the solution with a mixer, the resultant mixture was dried at 50° C. and the methanol was removed. The solid residue had a moisture content of 1.2%. This urea-impregnated partially saponified polyvinyl alcohol powder was fed to an extruding machine having a screw diameter of 50 mm. and a casing temperature varying longitudinally from a minimum of 80° C. to a maximum of 190° C., feeding being at the rate of 110 g. per min. The reaction product which was extruded from the nozzle of the extruder after a residence time of 5 min. had a bonded nitrogen content of 2.0%, and a degree of urethanation of 7.5%, with an unreacted free urea content of 1.2%. Compared with the partially-saponified polyvinyl alcohol initially used, this reaction product was more substantially soluble in cold water. A film produced from an aqueous solution of the reaction product in conventional manner at 70° C. was colorless and transparent. At a temperature of 20° C. and a relative humidity of 65%, the film exhibited a tensile strength of 1.5 kg./mm.$^2$, an elongation of 290%, and a tear strength of 3.7 kg./mm. Such a film having a thickness of 0.03 mm. dissolved in water at 20° C. in 20 seconds. This film did not show any drop in solubility even after heat-treatment at 180° C. for 20 minutes.

The conditions and the relative relationships set forth in the examples are those preferred in carrying out the process of this invention, but it will be understood that other conditions and relationships may be used within the scope of the invention. As mentioned above, in general, unless otherwise indicated, conventional operations and techniques are used and conventional apparatus is suitably employed, e.g. conventional mixing apparatus and conventional extrusion machines are advantageously employed. Pressure does not appear to be a parameter of the process which may be carried out at atmospheric pressure or at superatmospheric pressure, any superatmospheric pressure being that normally developed in the apparatus in which heating is effected.

If desired, the nitrogen-containing polyvinyl alcohol product may be processed into shaped forms in accordance with conventional techniques used in the polyvinyl alcohol art. Thus, to form fibers, the compositions are spun in conventional manner, e.g. by extruding an aqueous solution through small holes in a spinning jet into a medium effective to remove water therefrom. In wet spinning processes the medium can, for example, be a concentrated aqueous solution of a coagulating salt such as sodium sulfate or ammonium sulfate, while in dry spinning techniques air or an inert gas such as nitrogen is employed. Suitable spinning conditions for producing fibers from the spinning solutions of this invention are described, for example, in U.S. Patent 2,642,333 as well as in Cline et al. U.S. Patent 2,636,803 and Osugi et al. U.S. Patent 2,906,594.

The products are similarly formed into other shapes, such as films, by conventional techniques. Thus, films are suitably produced by the procedure described, for example, in Izard et al. U.S. 2,236,061 and in Herrmann et al. U.S. Patent 2,837,770.

It will also be understood that various changes and modifications in addition to those indicated above may be made in the embodiments herein described without departing from the scope of the invention as defined in the appended claims. It is intended, therefore, that all matter contained in the foregoing description shall be interpreted as illustrative only and not as limitative of the invention.

For example, any conventional treatments may be applied to the shaped forms, e.g. fibers or films, of the products of the invention. Thus, the fibers may suitably be stretched and heat treated in accordance with conventional techniques as illustrated, for example, in U.S. Patents 2,636,803, 2,636,804 and 2,906,594. Thus, the fibers are suitably stretched to a draw ratio of about 2:1 to 12:1 during or after spinning. For wet spun filaments, the stretching can be carried out directly after spinning while the fibers are wet at room temperature up to 100° C. to a draw ratio of about 5:1. For stretching to higher draw ratios, it is preferred to conduct the stretching in a heated medium such as air at 100–250° C.

Heat treatment is usually carried out by heating the shaped forms in a medium such as air at 210–250° C. for 2 seconds to 5 minutes.

To form acetalized polyvinyl alcohol, acetalization is conveniently carried out in conventional manner in an aqueous solution containing 0.2–10% aldehyde, 5–20% sulfuric acid and 0–25% sodium sulfate or ammonium sulfate at temperature of 40–80° C. for times ranging from a few minutes, e.g. 10 minutes, to several hours, e.g. 5 hours.

We claim:

1. An improved process for the preparation of a water soluble derivative of polyvinyl alcohol having a content of combined nitrogen higher than 0.4 percent which consists essentially of preparing a uniform polyvinyl alcohol-urea powder by mixing polyvinyl alcohol powder with urea in solution in a solvent selected from the group consisting of water and organic solvents for urea and drying the resulting mixture to remove said solvent, introducing said uniform polyvinyl alcohol-urea powder into an extrusion reaction zone maintained at a temperature higher than about 140° C., passing said uniform polyvinyl alcohol-urea powder through said zone while maintaining said zone temperature higher than about 140° C., whereby said introduced mixture is heated and said polyvinyl alcohol and said urea react to produce a uniform reaction product, the reaction time in said zone being sufficient to produce said product, and recovering the reaction product mixture which has been extruded from said zone containing a water-soluble derivative of polyvinyl alcohol having a content of combined nitrogen higher than 0.4 percent.

2. The process of claim 1 wherein the uniform polyvinyl alcohol-urea powder has a maximum water content of below 10 percent after drying.

3. A process according to claim 1, wherein said temperature is within the range of about 140° C. to about 230° C.

4. A process according to claim 3, wherein the amount of urea in said uniform mixture is about at least 2% based on the weight of said polyvinyl alcohol in said uniform mixture.

5. An improved process for the preparation of a water-soluble derivative of polyvinyl alcohol having a content of combined nitrogen higher than 0.4 percent which consists essentially of preparing a uniform polyvinyl alcohol-urea powder by mixing polyvinyl alcohol powder with urea in solution in a solvent selected from the group consisting of water and organic solvents for urea and drying the resulting mixture to remove said solvent, said uniform mixture having a water content below about 10% and containing an amount of urea that is at least about 2% based on the weight of the polyvinyl alcohol, introducing said uniform polyvinyl alcohol-urea powder into an extrusion reaction zone maintained at a temperature between about 140° and 230° C., passing said uniform polyvinyl alcohol-urea powder through said zone while maintaining said zone temperature higher than about 140° C., whereby said introduced mixture is heated and said polyvinyl alcohol and said urea react to produce a uniform reaction product, the reaction time in said zone being from about 2 minutes to about 100 minutes measured from the moment the material is charged into said zone to the moment of extrusion from said zone, and recovering the reaction product mixture which has been extruded from said zone containing a water-soluble derivative of polyvinyl alcohol having a content of combined nitrogen of about 0.4% to about 4%.

6. A process according to claim 5, wherein said derivative has a very high solubility in cold water and has a bound nitrogen content of about 1% to about 4%.

References Cited by the Examiner

UNITED STATES PATENTS

| | | | |
|---|---|---|---|
| 2,447,140 | 8/1948 | Shelton | 260—91.3 |
| 2,532,400 | 12/1950 | Fortress | 260—29.6 |
| 3,152,102 | 10/1964 | Suzumura et al. | 260—91.3 |

FOREIGN PATENTS

| | | |
|---|---|---|
| 519,049 | 2/1931 | Germany. |
| 542,286 | 1/1932 | Germany. |

WILLIAM H. SHORT, *Primary Examiner.*

LOUISE P. QUAST, *Assistant Examiner.*